United States Patent [19]

Elliott

[11] 4,362,467
[45] Dec. 7, 1982

[54] VARIABLE PITCH PROPELLER DEVICE

[76] Inventor: Morris C. Elliott, 11723 Norino Dr., Whittier, Calif. 90601

[21] Appl. No.: 59,285

[22] Filed: Jul. 20, 1979

Related U.S. Application Data

[63] Continuation-in-part of Ser. No. 10,483, Feb. 8, 1979, abandoned, which is a continuation-in-part of Ser. No. 841,130, Oct. 11, 1977, abandoned.

[51] Int. Cl.³ .......................................... B64C 11/38
[52] U.S. Cl. ................................. 416/157 R; 416/162
[58] Field of Search ............... 416/157 R, 162; 92/31, 92/136

[56] References Cited

U.S. PATENT DOCUMENTS

| | | | |
|---|---|---|---|
| 1,125,719 | 1/1915 | Ritchie | 416/166 |
| 1,383,379 | 7/1921 | Blain | 92/31 X |
| 1,777,254 | 9/1930 | Connors | 416/166 |
| 1,878,358 | 9/1932 | Yates | 416/157 X |
| 1,936,677 | 11/1933 | Kozub | 416/157 |
| 2,425,261 | 8/1947 | Murphy et al. | 416/157 |
| 2,553,128 | 5/1951 | Biermann | 416/162 |
| 2,554,611 | 5/1951 | Biermann | 416/162 |
| 2,717,652 | 9/1955 | Nichols | 416/157 |
| 2,970,442 | 2/1961 | Taylor | 92/31 |
| 3,024,848 | 3/1962 | Chilman et al. | 416/157 X |
| 3,034,584 | 5/1962 | Hindmarch | 416/162 |
| 3,051,249 | 8/1962 | Dirlik | 416/157 X |
| 3,056,457 | 10/1962 | MacFarland | 416/162 |
| 3,095,932 | 7/1963 | Hercules | 416/166 |
| 3,216,507 | 11/1965 | Curioni | 416/157 |
| 3,338,313 | 8/1967 | Tolley et al. | 416/157 |
| 3,567,340 | 3/1971 | Schneider et al. | 416/162 |
| 3,792,937 | 2/1974 | Chilman | 416/157 |
| 3,824,905 | 7/1974 | Jablonski | 92/136 |

FOREIGN PATENT DOCUMENTS

| | | | |
|---|---|---|---|
| 168030 | 12/1954 | Australia | 416/162 |
| 569867 | 6/1945 | United Kingdom | 416/137 |

Primary Examiner—Everette A. Powell, Jr.
Attorney, Agent, or Firm—Lyon & Lyon

[57] ABSTRACT

There is disclosed a hydraulically-controllable variable pitch propeller device capable of being removably mounted on a propeller shaft. The device includes a rotatable mounting flange and a stationary hydraulic mechanism located between the mounting flange and the propeller hub. The hydraulic mechanism includes a cylinder and a piston. The device also includes means for varying the pitch of the propeller blades in response to movement of the piston within the cylinder. The varying means includes a thrust face cooperating with a face of the piston, both the thrust face and piston face having mating races in which ball bearings are mounted.

The device also includes a novel control mechanism for regulating the amount of hydraulic fluid in the hydraulic cylinder for controlling the location of the piston and thus the pitch of the propeller blades.

19 Claims, 6 Drawing Figures

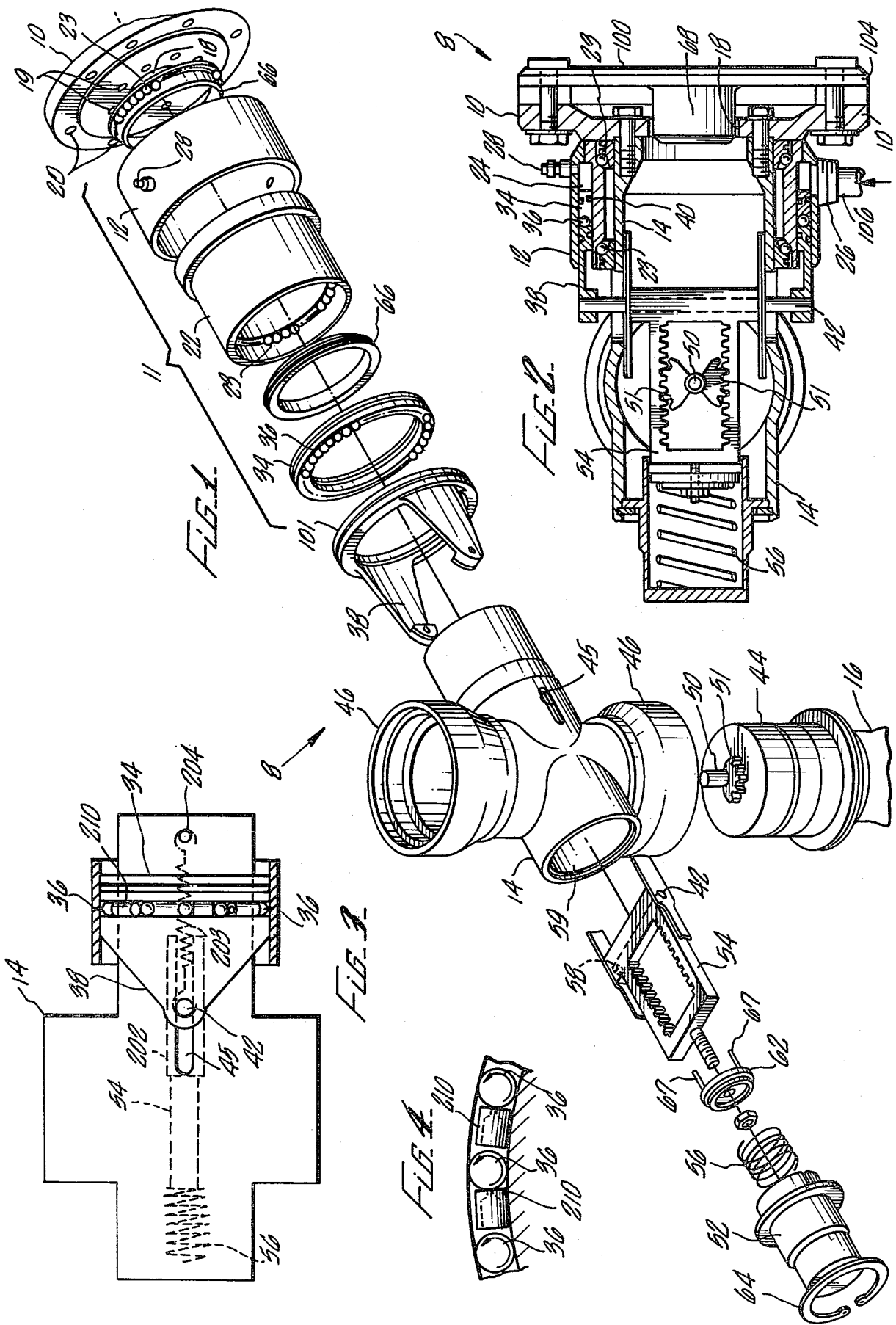

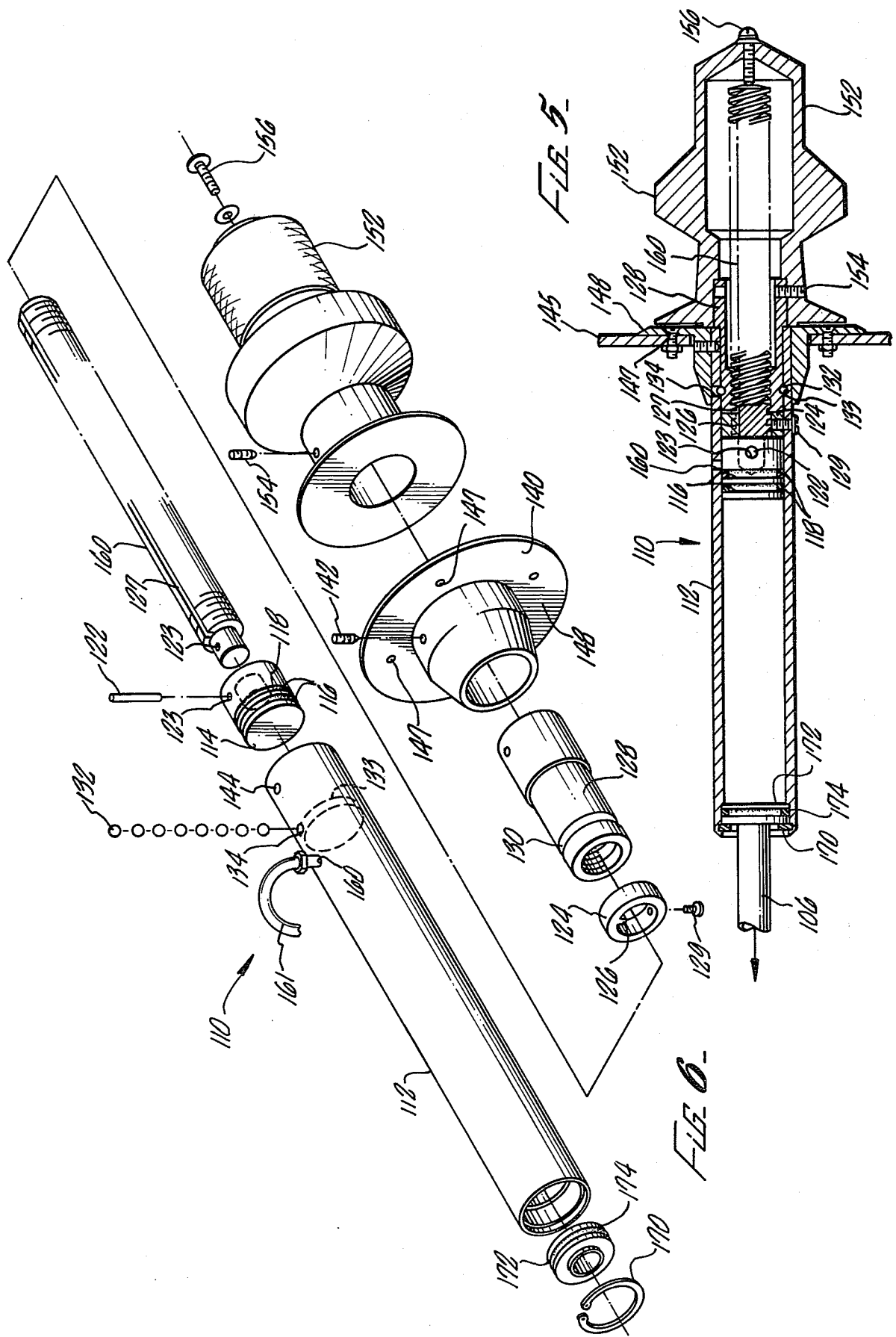

VARIABLE PITCH PROPELLER DEVICE

CROSS-REFERENCES

This application is a continuation-in-part of U.S. patent application Ser. No. 010,483 filed on Feb. 8, 1979, now abandoned, which is a continuation-in-part of U.S. patent application Ser. No. 841,130 filed on Oct. 11, 1977, now abandoned, both of which are incorporated herein by this reference.

BACKGROUND OF THE INVENTION

The present invention relates to propeller devices and in particular, relates to variable pitch propeller devices for airplanes.

During flight, the pitch of propellers of variable pitch propeller airplanes can be advantageously adjusted to adapt to various flight conditions. For example, the propeller is normally set at low pitch on takeoff, while climbing, and upon landing; high pitch when cruising and feathered if engine failure should occur.

Such variable pitch propeller devices are described in U.S. Pat. Nos. 1,936,677; 2,425,261; 2,553,128; 2,554,611; 2,717,652; 3,095,932; 3,024,848; 3,056,457; and 3,338,313. Other patents relevant to the variable pitch propeller device described herein are U.S. Pat. Nos. 1,125,717; 1,777,254; and 3,792,937; and British Pat. No. 569,867.

One prior art variable pitch propeller device comprises generally a hydraulically controlled adjusting mechanism positioned in the propeller hub. The mechanism is connected to the aircraft's hydraulic system through channels formed in the propeller shaft. Unfortunately, it is difficult and expensive to bore channels in the propeller shaft. Further, in some cases, it is difficult to correctly position the channels to accurately balance the propeller shaft. Another problem with boring channels in the propeller shaft is that with small airplanes, i.e., airplanes having engines with less than about 150 horsepower, the propeller shaft generally has inadequate structural integrity to be bored without risking failure during flight.

Another prior variable pitch device is disclosed in the aforementioned U.S. Pat. No. 2,554,611 which is issued to Biermann. Biermann discloses a hydraulically controlled mechanism which is secured to the engine crankcase. The mechanism is connected to a thrust pin which runs parallel to the propeller shaft and is connected to the base portion of each propeller blade. The hydraulically controlled mechanism actuates the thrust pin to vary the pitch of the propeller. Unfortunately, the pitch of the propeller can only be varied within a narrow range due to the juxtaposed position of the thrust pin to the propeller shaft. Further, because of the substantial modifications to the engine body and cowling required for installation of the mechanism, it is economically prohibitive to modify a fixed propeller airplane with retrofit equipment.

In the aforementioned U.S. Pat. No. 2,425,261, which is issued to Murphy et al., there is described in column 1 prior art hydraulically actuated propeller blade pitch changing mechanisms. It is noted by Murphy et al that it would be desirable to have the hydraulic mechanism located between the propeller and engine. Murphy et al. state that:

"In a class of this design, the hydraulic unit consists essentially of a stationary cylinder and non-rotating piston. This construction is obviously objectionable because of the fact that the total force exerted by the piston must be transmitted to the blade turning mechanism, located on the propeller hub, through the medium of a thrust bearing running at the same high speed as the propeller. To those familiar with the art, a bearing which would meet such severe operating conditions is too heavy and difficult to lubricate and also requires too much space to be adaptable to practical use for the purpose concerned."

In view of these problems, Murphy et al developed a device using a hydraulic cylinder concentrically mounted with the propeller shaft.

In spite of these problems with a stationary hydraulic unit mounted between the engine and the propeller, such a device retains certain attractions, because it has the potential for use on a large variety of airplanes.

Therefore, there is a need for a variable pitch propeller device which can vary the pitch of the propeller over a wide range, which can be used without modification of an airplane and its engine, permits the hydraulic unit to be mounted between the propeller and the engine, and can readily be used for a wide variety of airplanes, and in particular airplanes having engines of about 150 horsepower and less.

SUMMARY

The present invention is directed to a variable pitch propeller device having the above and other features. A particular advantage of the device is that it is suitable for removable mounting on an airplane propeller shaft flange, without necessitating any modifications to the propeller shaft, engine, or structure of the airplane. The device comprises a mounting flange, a propeller hub, and a hydraulic mechanism. The mounting flange is capable of being removably mounted on the engine propeller shaft flange and when mounted, is capable of rotating as the engine propeller shaft rotates. The propeller hub supports propellers blades, and is capable of rotating as the mounting flange rotates. The hydraulic mechanism is between the mounting flange and the propeller hub. The hydraulic mechanism comprises a cylinder and a piston slideable therein in response to the action of a hydraulic fluid. The cylinder and piston remain stationary as the mounting flange and propeller hub rotate. The device also includes means for varying the pitch of the propeller blades in response to movement of the piston within the cylinder. The varying means are capable of rotating as the mounting flange rotates.

This hydraulically-controllable variable pitch propeller device is very simple in that the propeller hub, hydraulic mechanism and varying means are all supported by the mounting flange rather than being mounted on the engine propeller shaft. In addition, the propeller hub, hydraulic mechanism and varying means are all aligned with the engine propeller shaft.

To accommodate the load between the rotating propeller hub and the stationary piston, the varying means includes a thrust face cooperating with a face of the piston. Both the thrust face and said piston face have mating races in which ball bearings are positioned.

Also contributing to the simplicity of the variable pitch propeller device of the present invention is the preferred control device used for supplying hydraulic fluid to the cylinder. The control device operates independent of the engine oil system and hydraulic system of the airplane in which the device is mounted. The control device also includes a hydraulic mechanism, where the hydraulic fluid capacity of the control device hydraulic mechanism is about equal to the hydraulic fluid capacity of the propeller hydraulic mechanism.

The control device hydraulic mechanism includes a hydraulic cylinder and a piston reciprocatingly movable therein and a nut within the cylinder for controlling the location of the piston. The nut is on the non-hydraulic fluid side of the piston. The nut has a race on its exterior surface and ball bearings mounted in the race for accommodating the back pressure from the hydraulic fluid.

DRAWINGS

These and other features, aspects and advantages of the present invention will become better understood with reference to the appended claims, following description and accompanying drawings where:

FIG. 1 is an exploded assembly view in perspective of a variable pitch propeller device according to the present invention;

FIG. 2 is a overhead cross-sectional view of the device of FIG. 1;

FIG. 3 is a front elevation view of a portion of a preferred version of a variable pitch propeller according to the present invention;

FIG. 4 shows in detail the ball bearing system used for the device of FIG. 3;

FIG. 5 is an exploded assembly view in perspective of a control assembly according to the present invention for use with the variable pitch propeller device of FIGS. 1-4; and FIG. 6 shows the assembled control device of FIG. 5 in cross-section.

DESCRIPTION

Referring to FIGS. 1 and 2, there is shown a variable pitch propeller device 8 according to the present invention comprising generally a mounting flange 10, a propeller hydraulic mechanism 11 including a hollow, tubular hydraulic cylinder 12, a propeller hub 14 and propeller blades 16. The mounting flange is provided with a central bore 18 and two circular rows of apertures 19 and 20.

The propeller hydraulic mechanism 11 has a central hollow, tubular core member 22 concentrically located in the cylinder 12 and an annular, hydraulic fluid passageway 24 between the core and the cylinder which extends substantially the entire length of the cylinder. The passageway 24 is provided with a hydraulic fluid inlet 26 and an air vent 28. The cylinder 12 is also provided with a ring-shaped piston 34 and a yoke 38 which are capable of being inserted into passageway 24. A face 101 of the yoke, referred to herein as a thrust face, mates with a face of the piston 34. Both faces having a race therein in which ball bearings 36 are provided. To extend the life of the ball bearings, they can be lubricated with grease. Nylon spacers and/or graphite pellets can be placed between adjacent ball bearings. It has been noted that during pre-flight ground testing of the hydraulic mechanism, the ball bearings can slip out of the races. To avoid this, the piston can be magnetized. The piston 34 is provided with a sealing ring 40 to prevent leakage of hydraulic fluid out of passageway 24. The yoke 38 is provided with a yoke pin 42.

The propeller hub 14 comprises a base portion 44, a slot 45 in which the yoke 38 is held by the yoke pin 42 and a pair of opposing collars 46 capable of receiving a base portion 48 of the propeller blades 16. The base portion 48 of each propeller blade 16 comprises two centrifugal thrust bearings available from Torrington Bearing of Torrington, Conn. and is provided with a shaft or pin 50 having a 90° quadrant pinion gear 51 connected thereto. The front of the hub 14 is open to receive a cap 52. A rack 54 and a spring 56 are insertable into the interior of the hub 14.

To assemble the device 8, the piston 34, the bearing 36 and yoke 38 are positioned in order in the passageway 24 of cylinder 12. The hydraulic cylinder 12 is made up as a unit with two rows of ball bearings 23 held in place by two ball bearing race supports 66 and slid over the outer surface of the base 44 of the hub 14. The race supports 66 are positioned onto the base 44 of the hub 14 by the propeller mounting flange 10 and are held in place by bolts 19. The yoke pin 42 is then positioned in the slot 45 of the hub 14 and connected to the yoke 38. The rack 54 is positioned within the interior of the hub 14 so that the pin 42 passes through an aperture 58 formed in the base of the rack. The propeller blades 16 are then inserted into the collars 46 of the hub 14 and the quadrant pinion gears 51 are interfitted into rack 54 with the shaft 50 inside, the pinion gears being coplanar. The spring 56 is then secured into a spring retainer knob 62 formed on the front of the rack and held in place with blade stops 67. The cap 52 is then positioned in the opening 59 of the hub to bias the spring 56 against the rack 54. The cap 52 is secured to hub 14 with a snap ring 64.

After the device has been assembled, it may be readily attached to any standard engine propeller shaft flange 100. Further, this device can be readily removed from the propeller shaft flange and reattached to other standard propeller shaft flanges or to jack shaft flanges. Standard propeller shaft flanges 100 generally comprise a protrusion 68. The variable pitch propeller device 8 is secured to the engine propeller shaft flange 100 by positioning the protrusion 68 into the bore 18 of the mounting flange and bolting the mounting flange to the engine propeller flange through the outer row of apertures 20 in the mounting flange. If desired, a spacer 104 can be positioned between the mounting flange and the propeller shaft flange. The hydraulic cylinder 12 is then secured to the engine frame or cowling by any suitable means to prevent rotation of the cylinder during operation. The cylinder may be secured to the cowling by simply attaching a clamp or fitting to the inlet 26 of the cylinder. Preferably this provides no support to the cylinder.

To operate the device 8, the inlet 26 of the hydraulic cylinder 12 is connected to any suitable hydraulic fluid actuating means and hydraulic fluid such as oil is introduced into the passageway 24 of the cylinder. The outlet 28 enables the removal of any air which may become trapped in the passageway. The propeller of the present invention preferably does not utilize any part of the engine oil system or any other hydraulic system of the aircraft. Preferably, the propeller has its own control, which is an oil volume displacement instrument with a combined mechanical and hydraulic advantage of approximately 8 to 1. The control preferably may be operated either manually or electrically and is preferably located in the cockpit and connected by an aluminum or plastic tube 106 such as Tygon tubing to the propeller at the connection 26. After the passageway 24 is filled with hydraulic fluid, the introduction of any additional fluid into the passageway forces the piston 34, the bearing 36 and the yoke 38 outwardly towards the cap 52 of the propeller hub 14. The movement of the yoke 38 causes a corresponding lateral movement of the rack 54 which rotates the quadrant pinions 51 in opposite directions and varies the pitch of the propeller blades. Since the rack 54 is biased by the spring 56 and the pitching movement of the propeller blades, the pitch of the propeller blades can be varied in the opposite direction by merely withdrawing hydraulic fluid from the passageway 24. The pitch of the propeller of the present invention can be varied by up to about 90° with the 8:1 mechanical and hydraulic advantage of the control instrument. The propeller blades can be locked in any adjusted position. If the hydraulic system fails during flight, the over pitching movement of the propeller blades and the spring 56 biases the rack to rotate the propeller blades into the low pitch mode against the blade stops 67. In operation, the mounting flange 10, yoke 38 and hub 14 rotate with the propeller hub shaft, while the cylinder 12 remains stationary. The smooth ball bearing races 66 and ball bearings 23 of the cylinder 12 enable the cylinder to float on the rotating hub, thereby stabilizing the cylinder. The ball bearings 36 prevent abrasion of the yoke 38 and the piston 34 during operation, as the piston 34 remains stationary with the cylinder 12. For maximum life of the yoke 38, piston 34 and ball bearing 36, preferably the ball bearings are fabricated of stainless steel, and the piston and the yoke are fabricated of 4130 steel coated with electroless nickel plating to inhibit corroson.

As is evident from FIGS. 1 and 2, the propeller hub, the hydraulic mechanism, and the apparatus used for varying the pitch of the propeller blades in response to the movement of the piston, including the yoke, the rack and pinion gears are all supported by the mounting flange 10 and are all axially aligned with the propeller shaft of the engine on which the device is mounted.

A problem has been noted in the version of the invention shown in FIGS. 1 and 2. This problem can arise when a pilot during pre-flight inspection flexes the propeller blades. Because the yoke 38 and the rack 54 are rigidly held together by the yoke pin 42, such flexing can twist the yoke away from the piston 34, thereby allowing the ball bearings to fall out of sequence. There is inadequate room available for a normal bearing cage to alleviate this problem.

A satisfactory solution has been found, and is shown in FIG. 3. A slot 202 aligned with the hub slot 45 is provided in the rack so that the yoke 38 can slide independently of the rack. Thus, the propeller blades can be flexed without moving the yoke pin 42 or the yoke 38. Mounting guides can be provided on the rack to insure that the rack slides as required. A spring 203 attached to the yoke pin 42 at one end and a pin 204 through the hub at the other end holds the yoke pin 42, the yoke 38, ball bearings 36, and piston 34 together.

As noted above, a nylon spacer 210 can be placed between each adjacent pair of ball bearings to extend the life of the ball bearings. This can be done with the bearings 36 between the yoke 38 and the piston 34 and-/or with the bearings 23 in the race supports 66. As shown in FIG. 4, the nylon spacers preferably are pieces of nylon rod cut approximately two ball bearing diameters long. The spacers are drilled all of the way through on the center line of the diameter, ¾ of the way with a drill ¾ of the nylon rod diameter, and ¼ of the way with a drill ⅛ of the nylon rod diameter. The nylon spacers are filled with a reservoir of ball bearing grease using a hypodermic needle. The spacers are assembled so that the small hole end is pushed by a ball bearing as the ball rolls, thereby spreading a lubricating film on the balls, spacers and rods.

This use of a spacer/lubricater between ball bearings extends the life of the bearings. The spacer need not be fabricated of nylon, but other durable and non-abrasive materials can be used.

A preferred control device 110 for hydraulically controlling the position of the piston 36 is shown in FIGS. 5 and 6. This device also includes a hydraulic mechanism including a hydraulic cylinder 112 and a piston 114 reciprocatingly slideable therein. The exterior surface of the piston has two circumferential grooves 116 for placement of O-rings 118 to avoid leakage of hydraulic fluid. A hydraulic fluid fill hole 160 is provided in the exterior surface of the cylinder.

The rear end of the piston is hollow and exteriorly double fluted or threaded lead screw 120 is inserted therein and held in place by a pin 122 inserted through aligned holes 123 of the piston and lead screw. A bushing 124 having an interior tang or key 126 is mounted on the lead screw with the tang keyed into a longitudinal groove 127 which extends along the length of the exterior surface of the lead screw. The bushing is secured to the cylinder by a screw 129. A nut 128 is threaded onto the front end of the lead screw 120 up against the rear of the bushing 124. The nut 128 has a circumferential race 130 on its exterior surface in which are contained ball bearings 132. There is a mating race 133 in the interior of the cylinder. The ball bearings are placed into the race through a hole 134 in the exterior surface of the cylinder 112. A housing 140 is mounted over the nut, bushing, lead screw, and piston and secured to the cylinder 112 by a set screw 142 which extends through a hole 144 at the tail end of the cylinder. The housing 140 is secured to a mounting surface 145 in the cockpit of an airplane by fasteners 146 extending through holes 147 in a circumferential flange 148 of the housing 140. A knurled knob 152 sits up against this flange and is secured to the tail end of the nut 128 by a set screw 154. The lead screw extends into the interior of the knob, and the relative longitudinal position between the lead screw and the knob are determined by the location of a screw 156 mounted in the back side of the knob. By unscrewing the screw 156, the piston can be retracted behind the fill hole 160 for filling the hydraulic mechanism with hydraulic fluid via tubing 161. When the screw 156 is screwed back into place in the know 152, the piston is and its O-rings are beyond the fill hole 160 so oil cannot leak out of the hydraulic cylinder.

When the knob is rotated, only the nut, which is secured directly to the knob rotates. All of the other elements of the control assembly including the hydraulic cylinder, lead screw, piston, and bushing are either directly or indirectly connected to the housing 140, which cannot rotate due to its mounting to the interior cockpit of the airplane. The lead screw of course is prevented from rotating by the cooperation of the key 126 and the groove in the lead screw. Rotating the knob rotates the nut which advances the lead screw longitudinally in the cylinder, which in turn moves the piston 114 longitudinally within the hydraulic cylinder 112. The nut cannot move longitudinally relative to the cylinder because of the ball bearings 132.

Mounted by a snap ring 170 at the front end of the hydraulic cylinder is a fitting 172 having an O-ring 174 on its exterior surface, and attached to the fitting is the tubing 106 used for providing hydraulic fluid to the propeller hydraulic mechanism 11.

Because of the working angle between the flutes of the lead screw and the threads of the nut, back pressure of hydraulic fluid cannot move the nut. Therefore, the propeller blades are locked into a desired pitch.

In the preferred version of the control assembly, the cylinder has an internal diameter of ¾ inch, the maximum travel of the piston in the cylinder is 3.5 inches, and the mechanism provides a hydraulic advantage of about 4.3:1.

A particular advantage of this control mechanism is the use of ball bearings between the nut 128 and the hydraulic cylinder. This bearing mechanism has been found to reliably accommodate the back pressure of the hydraulic fluid generated by rotation of the pitched propeller blades. The bearing mechanism also serves to lock the propeller blades at a desired pitch. For a long-lived control mechanism, preferably both the nut and the hydraulic cylinder are fabricated of hardened and honed Chromalloy 4130. The same is true of all other critical components of the variable pitch propeller device and its control mechanism. However, the rack can be made of mild steel.

Preferably the maximum hydraulic fluid volume of the control assembly hydraulic mechanism is about equal to the maximum hydraulic fluid volume of the hydraulic mechanism 11 of the propeller control mechanism. This provides positive control of the pitch of the propeller blades. For example, to obtain low pitch for takeoffs, the knob 152 is turned all of the way to the right so that substantially all of the hydraulic fluid is in the cylinder 112 which is full of hydraulic fluid, and the hydraulic fluid passageway 24 has minimum amount of hydraulic fluid.

The variable pitch propeller device, including the control mechanism shown in the drawings described herein has been successfully tested. In use, it has demonstrated a long life. It is suitable for being removably mounted directly on airplane engine propeller shaft flange without requiring modification. It is suitable for use on low powered airplanes, including airplanes having engines with less than about 150 horsepower. It does not have to be mounted on the main engine shaft, but rather can be mounted on an auxiliary shaft. The device has been successfully tested on airplanes have unusually high RPM's such as the Bede-5 aircraft which has a driveshaft speed of about 4500 RPM and an engine speed of about 6000 RPM. It is found that the variable pitch propeller device of this invention greatly improved the performance of the Bede-5 aircraft. It improved air speed by over 25% from 150 mph indicated to 190 mph indicated. It improved take-off roll by almost 50%. The plane originally required 2500 feet of take-off roll, but with the variable pitch propeller required only 1250 to 1500 feet. Furthermore, the device improved by about 100% the climb-out rate. The Bede-5 aircraft originally had a climb-out rate of 600-800 feet and with the variable pitch propeller device of the present invention the climb-out rate was from about 1200 to 1600 feet per minute.

An expert in the field who has attempted to develop a variable pitch propeller of simplified design suitable for the Bede-5 airplane has expressed surprise at the simplicity of the variable pitch propeller of the present invention and the efficient control mechanism described herein. Since its introduction in late 1978, many devices according to the present invention have been sold and many more have been ordered, thereby displaying exceptional commercial success.

While an embodiment and application of this invention has been shown and described, it will be apparent to those skilled in the art that many more modifications are possible without departing from the inventive concepts herein described. For example, the variable pitch device described herein can be used not only on airplanes, but also on boats. The invention, therefore, is not to be restricted except as is necessary by the prior art and by the spirit of the appended claims.

What is claimed is:

1. A hydraulically-controllable variable pitch propeller device for removable mounting of a propeller shaft flange comprising:
   (a) a mounting flange removably mountable on an engine propeller shaft flange to rotate as the engine propeller shaft rotates;
   (b) a propeller hub for supporting propeller blades, the hub being supported by the mounting flange to rotate as the mounting flange rotates;
   (c) a propeller hydraullic mechanism supported by the mounting flange and positioned between the mounting flange and the propeller hub, the propeller hydraulic mechanism comprising a cylinder and a piston slideable therein in response to the action of a hydraulic fluid, the cylinder and piston remaining stationary as the mounting flange and propeller hub rotate; and
   (d) means for varying the pitch of the propeller blades in response to movement of the piston within the cylinder, said varying means being supported by the mounting flange to rotate as the mounting flange rotates;
   wherein the propeller hub, the propeller hydraulic mechanism, and the varying means, when mounted on a propeller shaft, are axially aligned with the propeller shaft.

2. The device of claim 1 wherein said varying means includes a thrust face cooperating with a face of the piston, both the thrust face and said piston face having mating races in which ball bearings are located.

3. The device of claim 1 including means for supplying hydraulic fluid to the cylinder, said means being independent of the engine oil hydraulic system of the engine of the propeller shaft on which the device is mounted.

4. The device of claim 3 in which the supply means includes a control hydraulic mechanism wherein the hydraulic fluid capacity of the control hydraulic mechanism is about equal to the hydraulic fluid capacity of the propeller hydraulic mechanism.

5. The device of claim 3 in which the supply means includes a control hydraulic cylinder, a piston reciprocatingly movable therein, and a lead screw with a nut thereon within the control cylinder for controlling the location of the piston, the lead screw and nut being on the non-hydraulic fluid side of the control piston, the nut having a race on its exterior surface and ball bearings mounted therein for accommodating the back pressure of the hydraulic fluid.

6. The device of claim 1 wherein said varying means comprises a rack and pinion.

7. The device of claim 6 wherein said rack is spring biased so that the rack can vary the pitch of the propellers to a pre-determined pitch upon failure of the propeller hydraulic mechanism.

8. The device of claim 2 wherein said varying means comprises a yoke, the thrust face being a face of the yoke.

9. The device of claim 1 or 6 wherein said device is capable of varying the pitch of the propeller blades up to about 90°.

10. An airplane comprising an engine, a rotatable propeller shaft powered by the engine, a propeller shaft flange, and a hydraulically-controllable variable pitch propeller device removably mounted on the propeller shaft flange, the propeller device comprising:
(a) a mounting flange removably mounted on the engine propeller shaft flange to rotate as the engine propeller shaft rotates;
(b) a propeller hub supporting propeller blades, the hub being supported by the mounting flange to rotate as the mounting flange rotates;
(c) a propeller hydraulic mechanism supported by the mounting flange and positioned between the mounting flange and the propeller hub, the propeller hydraulic mechanism comprising a cylinder and a piston slideable therein in response to the action of a hydraulic fluid, the cylinder and piston remaining stationary as the mounting flange and propeller hub rotate;
(d) means for varying the pitch of the propeller blades in response to movement of the piston within the cylinder, said varying means being supported by the mounting flange to rotate as the mounting flange rotates; and
(e) means for supplying hydraulic fluid to the cylinder independent of any other hydraulic system of the airplane;
wherein the propeller hub, the propeller hydraulic mechanism, and the varying means are axially aligned with the propeller shaft.

11. The airplane of claim 10 in which the engine of the airplane has horsepower of less than about 150 horsepower.

12. The airplane of claim 10 in which the engine propeller shaft is solid.

13. A hydraulically-controlled, variable pitch propeller device for use with solid propeller drive shafts comprising:
a mounting flange removably securable to a flange of said solid propeller drive shaft;
a propeller hub connected to said mounting flange and having a base portion, said hub having a plurality of openings capable of receiving a plurality of propeller blades, said hub being provided with means to vary the pitch of said propellers up to about 90°, said means being disposed within said hub; and
a hydraulic cylinder having a channel for receiving the base portion of said hub, said channel formed to enable said cylinder to float on said hub during operation of said device, said cylinder coupled to the varying means for actuating the varying means, said cylinder being located between the mounting flange and the propeller hub.

14. A hydraulically-controllable variable pitch propeller device for removable mounting on a propeller shaft flange comprising:
(a) a mounting flange removably mountable on an engine propeller shaft flange to rotate as the engine propeller shaft rotates;
(b) a propeller hub for supporting propeller blades, the hub being supported by the mounting flange to rotate as the mounting flange rotates;
(c) a propeller hydraulic mechanism supported by the mounting flange and positioned between the mounting flange and the propeller hub, the propeller hydraulic mechanism comprising a cylinder and piston slideable therein in response to the action of a hydraulic fluid, the cylinder and piston remaining stationary as the mounting flange and propeller hub rotate; and
(d) means for varying the pitch of propeller blades in response to movement of the piston within the cylinder, said varying means being supported by the mounting flange to rotate as the mounting flange rotates, said varying means including a thrust face cooperating with a face of the piston, both the thrust face and said piston face having mating races in which ball bearings are mounted.

15. The airplane of claim 10 in which the propeller shaft flange on which the device is mounted is a jack shaft flange.

16. The device of claim 2 or 14 including a spacer between adjacent ball bearings.

17. The device of claim 16 in which the spacer is made of nylon.

18. The device of claim 16 in which the spacer contains a reservoir of lubricant.

19. The device of claim 1 in which the varying means comprises a yoke, a rack, and a pinion for the rack, the yoke sliding in response to movement of the piston, the yoke being slideably mounted relative to the rack and the propeller hub so that flexing of the propeller does not twist the yoke away from the propeller hydraulic mechanism.

* * * * *